(12) United States Patent
Patil et al.

(10) Patent No.: US 10,589,638 B2
(45) Date of Patent: Mar. 17, 2020

(54) ELECTRIC VEHICLE CHARGING DEVICE AND METHOD FOR CHARGING ELECTRIC VEHICLE

(71) Applicant: EATON INTELLIGENT POWER LIMITED, Dublin (IE)

(72) Inventors: Chinmaya Baburao Patil, South Lyon, MI (US); Yigang Wang, Maple Grove, MN (US); Ronald L. Thompson, Knoxville, TN (US); Jose Antonio Trujillo, Pewaukee, WI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 16/548,213

(22) Filed: Aug. 22, 2019

(65) Prior Publication Data

US 2019/0375307 A1 Dec. 12, 2019

Related U.S. Application Data

(62) Division of application No. 15/295,242, filed on Oct. 17, 2016, now Pat. No. 10,427,548.

(51) Int. Cl.
*H02J 7/00* (2006.01)
*H02J 7/14* (2006.01)
*B60L 53/31* (2019.01)

(52) U.S. Cl.
CPC ............ *B60L 53/31* (2019.02); *H02J 7/007* (2013.01); *H02J 7/0021* (2013.01); *H02J 2007/0096* (2013.01)

(58) Field of Classification Search
USPC ....... 320/107, 108, 109, 137, 162, 132, 104, 320/103, 106
See application file for complete search history.

(56) References Cited

U.S. PATENT DOCUMENTS

| | | |
|---|---|---|
| 2010/0174667 A1 | 7/2010 | Vitale et al. |
| 2013/0184882 A1 | 7/2013 | Momose et al. |
| 2014/0225565 A1 | 8/2014 | Eger et al. |
| 2015/0069969 A1 | 3/2015 | Wu et al. |
| 2015/0158393 A1 | 6/2015 | Kawano et al. |
| 2016/0272079 A1 | 9/2016 | Quoc-Tuan et al. |
| 2016/0380488 A1 | 12/2016 | Widmer et al. |
| 2017/0043674 A1 | 2/2017 | DeBoer, III |
| 2017/0138758 A1 | 5/2017 | Ricci |

*Primary Examiner* — Alexis B Pacheco
(74) *Attorney, Agent, or Firm* — Eckert Seamans Cherin & Mellott, LLC

(57) ABSTRACT

An electric vehicle charging device includes a processing unit having a memory with a routine stored therein which, when executed by the processing unit causes the processing unit to control circuitry to prevent the electric vehicle charging device from charging an electric vehicle for a random delay period and to allow the electric vehicle charging device to charge the electric vehicle starting when the random delay period ends, wherein the random delay period starts at a predetermined start time and lasts a random delay length of time. The random delay reduces the peak load on a transformer that the electric vehicle charging device and other electric vehicle charging devices receive power from.

20 Claims, 5 Drawing Sheets

ELECTRIC VEHICLE CHARGING DEVICE AND METHOD FOR CHARGING ELECTRIC VEHICLE

CROSS-REFERENCE TO RELATED APPLICATION

This patent application claims the priority benefit under 35 U.S.C. § 119(e) of U.S. Utility patent application Ser. No. 15/295,242, filed on Oct. 17, 2016, and entitled, "ELECTRIC VEHICLE CHARGING DEVICE AND METHOD FOR CHARGING ELECTRIC VEHICLE," the contents of which are hereby incorporated herein by reference.

BACKGROUND

Field

The disclosed concept relates generally to electric vehicles, and more particularly, to electric vehicle charging devices. The disclosed concept also relates to methods for charging electric vehicles.

Background Information

An electric vehicle (EV) periodically needs to be plugged in to recharge its battery. An EV is often plugged in to recharge at the owner's residence. Recharging an EV, however, requires a significant amount of power.

In many types of residential power distribution systems a transformer receives power from a utility. Power is then provided from the transformer to multiple residences via power lines between the transformer and load centers of the residences. For example, one transformer may service an entire neighborhood. There is a limit to the amount of power that can pass through the transformer and if the residences serviced by the transformer attempt to draw too much power simultaneously, the transformer can become overloaded.

As EVs become more common and more EVs are charged at residences, the power requirements for a set of residences serviced by a transformer can significantly increase due to the power required to charge the EVs. The increase can create a situation where a transformer becomes overloaded and cannot meet the power demands of the residences it services during peak demand times. Replacing the transformer with a higher capacity transformer or adding additional transformers so that each transformer services a lower number of residences would solve the problem. However, these solutions are very expensive. It is desirable to cope with the increased power requirements of residences due to EV charging in a less costly manner.

There is room for improvement in electric vehicle charging devices. There is also room for improvement in methods for charging electric vehicles.

SUMMARY

These needs and others are met by embodiments of the disclosed concept, which are directed to an electric vehicle charging device capable of reducing the peak load imposed on a transformer due to charging of multiple electric vehicles. These needs and others are also met by embodiments of the disclosed concept, which are directed to a method of charging an electric vehicle which reduces the peak load imposed on a transformer due to charging of multiple electric vehicles.

In accordance with aspects of the disclosed concept, an electric vehicle charging device for use in charging a corresponding electric vehicle electrically connected to the electric vehicle charging device comprises: control circuitry structured to selectively allow the electric vehicle charging device to charge the electric vehicle; a processing unit having a memory with a routine stored therein which, when executed by the processing unit causes the processing unit to: estimate a charging length of time needed for the electric vehicle to reach a fully charged state; determine a maximum delay length of time as a difference between a predetermined length of time and the charging length of time, wherein the predetermined length of time is defined by a predetermined start time and a predetermined end time; randomly select a random delay length of time that is less than or equal to the maximum delay length of time; and control the control circuitry to prevent the electric vehicle charging device from charging the electric vehicle for a random delay period and to allow the electric vehicle charging device to charge the electric vehicle starting when the random delay period ends, wherein the random delay period starts at the predetermined start time and lasts the random delay length of time.

In accordance with other aspects of the disclosed concept, an electric vehicle charging device for use in charging a corresponding electric vehicle electrically connected to the electric vehicle charging device comprises: control circuitry structured to selectively allow the electric vehicle charging device to charge the electric vehicle; a communication interface structured to provide communication with other electric vehicle charging devices; a processing unit having a memory with a routine stored therein which, when executed by the processing unit causes the processing unit to: initiate a load shedding process having an associated load shedding power level and a load shedding period of time; estimate a charging length of time needed for the electric vehicle to reach a fully charged state; control the communication interface to transmit the charging length of time to one or more other electric vehicle charging devices associated with other electric vehicles; receive charging length of times associated with other electric vehicles via the communication interface; determine charging priority ranks of the electric vehicle and the other electric vehicles based on the charging lengths of time associated with the electric vehicle and the other electric vehicles; determine a threshold rank based on the load shedding power level; and control the control circuitry to prevent the electric vehicle charging device from charging the electric vehicle for the load shedding period of time if the charging priority rank of the electric vehicle is equal to or less than the threshold rank and to allow the electric vehicle charging device to charge the electric vehicle for the load shedding period of time if the charging priority rank of the electric vehicle is greater than the threshold rank.

In accordance with other aspects of the disclosed concept, a method of charging an electric vehicle with an electric vehicle charging device comprises: estimating a charging length of time needed for the electric vehicle to reach a fully charged state; determining a maximum delay length of time as a difference between a predetermined length of time and the charging length of time, wherein the predetermined length of time is defined by a predetermined start time and a predetermined end time; randomly selecting a random delay length of time that is less than or equal to the maximum delay length of time; and preventing the electric vehicle charging device from charging the electric vehicle for a random delay period and allowing the electric vehicle charging device to charge the electric vehicle starting when the random delay period ends, wherein the random delay period starts at the predetermined start time and lasts the random delay length of time.

In accordance with other aspects of the disclosed concept, a method of charging an electric vehicle with an electric vehicle charging device comprises: initiate a load shedding process having an associated load shedding power level and a load shedding period of time; estimating a charging length of time needed for the electric vehicle to reach a fully charged state; transmitting the charging length of time to one or more other electric vehicle charging devices associated with other electric vehicles; receiving charging length of times associated with other electric vehicles; determining charging priority ranks of the electric vehicle and the other electric vehicles based on the charging lengths of time associated with the electric vehicle and the other electric vehicles; determining a threshold rank based on the load shedding power level; and preventing the electric vehicle charging device from charging the electric vehicle for the load shedding period of time if the charging priority rank of the electric vehicle is equal to or less than the threshold rank and allowing the electric vehicle charging device to charge the electric vehicle for the load shedding period of time if the charging priority rank of the electric vehicle is greater than the threshold rank.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
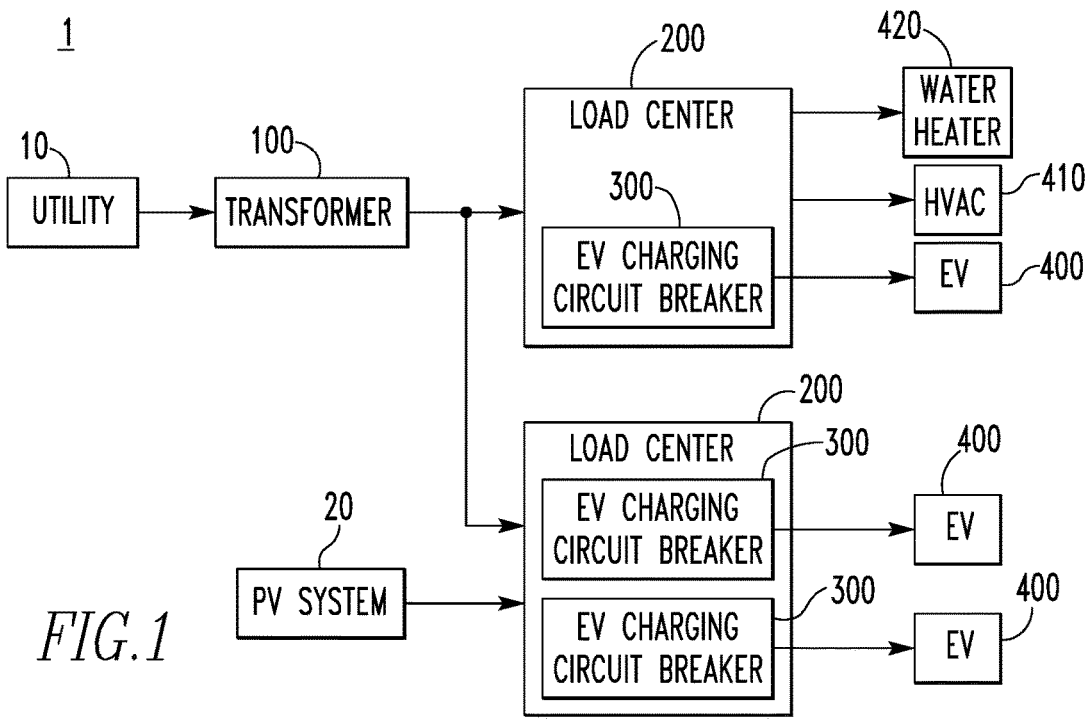
FIG. 1 is a schematic diagram of an electrical distribution system in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the term "processor" shall mean a programmable analog and/or digital device that can store, retrieve and process data; a controller; a control circuit; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the term "number" shall mean one or an integer greater than one (i.e., a plurality).

As employed herein, the term "electric vehicle" or "EV" shall mean a vehicle that uses electric power to drive and refers to vehicles that only use electric power to drive or hybrid vehicles that, for example, use electric power, combustion power, or a combination thereof to drive.

For many EV owners, postponing the time that the EV starts charging until later in the night does not present any inconvenience. For example, in a typical scenario an EV owner returns from work in the evening and plugs in their EV to charge overnight. Often, the owner does not need the EV to charge for later use in the evening. Rather, in most cases, as long as the EV is fully charged by the next morning, there is no inconvenience to the user.

The demand for electricity in residential areas historically peaks in the evening hours and is very low late at night and very early in the morning. Adding EV charging to the already high demand in the evening can put a strain on the electrical distribution system servicing a residential area. In particular, the demand for electricity can overload a transformer servicing a set of residences. In accordance with some example embodiments of the disclosed concept, an electrical distribution system can coordinate the charging of EVs in order to minimize the demand during peak load times. For example and without limitation, the electrical distribution system may control EV charging so that it is deferred to a lower demand time such as late at night or early in the morning.

Delaying the charging of EVs until after a defined peak load period alone can cause another issue. Namely, if all of the EVs serviced by a transformer begin charging simultaneously after the end of the defined peak period, the demand for electricity from the EVs simultaneously charging could potentially cause the transformer to overload. Staggering the charging of the EVs though the night can smooth the peak load caused by the EVs and reduce the risk of the transformer overloading. In accordance with some example embodiments of the disclosed concept, electric vehicle charging devices can charge EVs in a manner that reduces the peak load caused by charging the EVs.

FIG. 1 is a schematic diagram of an electrical distribution system 1 in accordance with an example embodiment of the disclosed concept. The electrical distribution system 1 includes a transformer 100 and one or more load centers 200. The transformer 100 is configured to receive power from a utility 10 and provide the received power to the load centers 200. In some example embodiments of the disclosed concept, the load centers 200 may each correspond to a residence. Each load center 200 may provide power to one or more electrical devices at the corresponding residence (e.g., without limitation, an EV 400, a heating, ventilation, and air conditions system (HVAC) 410, a water heater 420, etc.).

In an example embodiment of the disclosed concept, one or more of the load centers 200 includes one or more EV charging circuit breakers 300. In some embodiments, the EV charging circuit breakers 300 are circuit breakers that are capable of providing a Level 2 AC EV charging capability. The EV charging circuit breakers 300 may work in conjunction with an EV charging station and/or an EV charging cable to charge a corresponding EV 400.

The EV charging circuit breakers 300 are able to generate EV charging information about their corresponding EVs 400. The EV charging information may include an estimated time to fully charge the EV 400 or an estimated time remaining for the EV 400 to reach a fully charged state. For example, the EV charging circuit breakers 300 may be able to determine a time that the EV 400 was plugged in. The EV charging circuit breakers 300 may also be able to estimate the state of charge of the EV 400 (e.g., the percentage of charge the EV 400 has) and the total charge energy needed during a charge event by, for example, monitoring historical charge patterns of the EV 400 and the instantaneous power drawn by a charger in the EV 400. Chargers in EVs 400 are typically capable of drawing different amounts of power from an external charging device such as the EV charging circuit breakers 300. When the state of charge of the EV 400 is low, the charger in the EV 400 will typically draw the highest amount of power it is rated for. As the state of charge of the EV 400 increases to its maximum, the charger in the EV 400 will draw a lower amount of power to maintain constant battery voltage. The time from when the EV 400 is plugged in to the time when the charger in the EV 400 reduces the amount of power drawn is an estimate of the amount of time it takes to fully charge the EV 400. Metering circuitry included in the EV charging circuit breaker 300 may be used to monitor the amount of power drawn by the charger in the EV 400 and, thus the EV charging circuit breaker 300 may thus be able to determine the time when the EV 400 reaches the fully charged state (e.g., the time when the charger in the EV 400 reduces the amount of power it draws. The EV charging circuit breaker 300 is thus able to estimate the time it takes to fully charge the EV 400 as the time from when the EV 400 is plugged in to when the EV 400 reaches its fully charged state without interruptions in charging. When estimating the time to reach the fully charged state, the EV charging circuit breaker 300 may subtract any interruptions in charging.

Each time the EV 400 is charged, the EV charging circuit breaker 300 may store the amount of time taken to fully charge the EV 400 as historical charge pattern data. The historical charge pattern data allows the EV charging circuit breaker 300 to more accurately estimate the time it will take to fully charge the EV 400 when it is plugged in. For example, the historical charge pattern data may show that the time to fully charge the EV 400 is correlated with the time the EV 400 was plugged in. For instance, the historical data may show that the EV 400 typically takes about 3 hours to fully charge when it is plugged in at 2:00 PM, but it typically takes about 6 hours to fully charge when it is plugged in at 8:00 PM. Thus, if the EV 400 is plugged in at 8:00 PM, the EV charging circuit breaker 300 may determine that the estimated time to fully charge the EV 400 is about 6 hours. While a correlation between the historical time to fully charge and the plug-in time is one example of how the historical charge pattern data may be used to more accurately estimate the time to fully charge the EV 400, it will be appreciated by those having ordinary skill in the art that there are a variety of ways that the historical charge pattern data may be used to more accurately estimate the time to fully charge the EV 400. For example, recent historical charge pattern data may be weighted more heavily than older charge pattern data, a correlation between the time of year (e.g., winter, summer, etc.) and the historical charge pattern data may be used, etc.

Once the EV charging circuit breaker 300 has estimated a time to fully charge the EV 400, it EV charging circuit breaker 300 may estimate the remaining time to reach the fully charged state. The estimated time needed to reach the fully charged state is the estimated time to fully charge the EV 400 minus the time that the EV 400 has been charging. Thus, if the estimated time to fully charge the EV 400 is 6 hours and the EV 400 has been plugged in and charging for 2 hours, the time needed to reach the fully charged state is 4 hours. The EV 400 is able to estimate the time needed for the EV 400 to reach the fully charged state without directly communicating with the EV 400. However, it is contemplated that in some embodiments, the EV charging circuit breaker 300 may communicate with the EV 400 and use information from the EV 400 to estimate the time needed for the EV 400 to reach the fully charged state.

The EV charging circuit breakers 300 and the transformer 100 may both have the capability of communicating. For example, the EV charging circuit breakers 300 and transformer 100 may be able to communicate with each other or other devices via wired and/or wireless communication. In some example embodiments of the disclosed concept, the EV charging circuit breakers 300 and/or the transformer 100 are able to communicate wirelessly using one or more suitable wireless communication protocols (e.g., Wi-Fi, Bluetooth®, radiofrequency, etc.). Additionally, in some example embodiments of the disclosed concept, the EV charging circuit breakers 300 and/or the transformer 100 are able to communicate via one or more wired communication protocols. The EV charging circuit breakers 300 and/or the transformer 100 may also be able to communicate with the utility 10 or other power sources such as a renewable power source (e.g., without limitation, a photovoltaic system 20).

In some example embodiments of the disclosed concept, the EV charging circuit breakers 300 are configured to control the charging of their corresponding EVs 400 by delaying charging of the EVs 400 a random amount of time after a predetermined peak load time. For example, a time period for charging the EVs 400 may be the time between the end of the predetermined peak load time (e.g., 10:00 PM) and a predetermined time in the morning (e.g., 6:00 AM). Each of the EV charging circuit breakers 300 estimates the time required for their corresponding EVs 400 to reach the fully charged state and determines the maximum amount of time that charging may be delayed after the end of the predetermined peak load time while still leaving enough time to charge the EV 400 to its fully charged state by the predetermined time in the morning. The EV charging circuit breaker 400 then selects a random delay time less than or equal to the maximum amount of time the charging may be delayed. The EV charging circuit breaker 300 then begins charging the EV 400 after the random delay time.

Delaying charging until after the predetermined peak load time eases the peak load on the transformer by preventing the EVs 400 from charging during the peak load time. Each EV charging circuit breaker 300 selects its own random delay time so the EV charging circuit breakers 300 do not all start charging their corresponding EVs 400 simultaneously, thus smoothing the load applied to the transformer 100 by the EVs 400.

In some embodiments of the disclosed concept, the electrical distribution system 1 may use a load shedding algorithm which may cause selected ones of the EV charging circuit breakers 300 to stop charging their corresponding EVs 400 for a period of time. The load shedding may have an associated load shedding level and period of time. For example and without limitation, the load shedding level may be 100 kW and the associated time period may be 9:00 PM-11:00 PM. However, it will be appreciated that any load shedding level and period of time may be selected without departing from the scope of the disclosed concept. During the load shedding period, the load shedding algorithm may cause selected ones of the EV charging circuit breakers 300 to stop charging their corresponding EVs 400 for the period of time in order to reduce the load on the transformer 100 by the load shedding level. After the period of time, the EV charging circuit breakers 300 may resume charging their corresponding EVs 400.

The load shedding algorithm may use EV charging information (e.g., estimated time until the EV 400 reaches its fully charged state) to rank the EVs 400 and determine which EV charging circuit breakers 300 to control to stop charging. For example, the load shedding algorithm may aim to have all EVs 400 fully charged by a predetermined time in the morning. If an EV 400 is very low on charge and would not be fully charged by morning if its charging were turned off during the load shedding period, the load shedding algorithm may rank that EV 400 as a high priority for charging during the load shedding period. Other EVs 400 that do not require a significant amount of time to reach a fully charged state may receive a lower priority rank for charging during the load shedding period. The load shedding algorithm may causing charging to be turned off for the lowest rank EVs 400 until the load shedding level is met. For example, if the load shedding level is 100 kW and each EV 400 draws 10 kW for charging, the load shedding algorithm will cause the ten lowest ranked EVs 400 to stop charging.

In some example embodiments of the disclosed concept, the load shedding algorithm may have a set time period associated with load shedding. For example, the associated time period may be a predetermined time period each day. However, in some embodiments of the disclosed concept, the time period associated with load shedding may be triggered by an event. For example, the transformer 100 may monitor its load and initiate load shedding when its load reaches a predetermined level so as to prevent the transformer from overloading. The time period associated with load shedding may have a fixed or variable length.

In some embodiments of the disclosed concept, the load shedding algorithm may be implemented by routines executed in the EV charging circuit breakers 300 and/or the transformer 100. The EV charging circuit breakers 300 may communicate the EV charging information (e.g., without limitation, the time to reach a fully charged state) for their corresponding EVs 400 to the other EV charging circuit breakers 300. Each EV charging circuit breaker 300 will then have the EV charging information for all of the EVs 400 being charged with power from the transformer 100. Each EV charging circuit breaker 300 is then able to determine the charging priority rank of the EVs 400. Each EV charging circuit breaker 300 is also able to determine a threshold rank. The threshold rank is the rank which divides which EVs 400 may continue charging and which should stop charging in order to meet the load shedding level. For example, EVs 400 having a charging priority rank at or below the threshold rank should stop charging during the period of time associated with load shedding. Since each EV charging circuit breaker 300 may determine the charging priority rank of it corresponding EV 400 and the threshold rank, each EV charging circuit breaker 300 is able to determine whether it should stop charging its corresponding EV 400 during the period of time associated with load shedding. If an EV charging circuit breaker 300 determines that it should stop charging its corresponding EV 400 during the period of time associated with load shedding, it may control itself to stop charging the corresponding EV 400 during the period of time.

A central controller is not needed to implement the load shedding algorithm. However, it will be appreciated by those having ordinary skill in the art that a central controller may determine the charging priority ranks of EVs 400 and control selected EV charging circuit breakers 300 to turn off charging during the time period associated with load shedding. Similarly, one of the EV charging circuit breakers 300 may be designated as a master and serve as the central controller without departing from the scope of the disclosed concept.

In addition to EVs 400, the electrical distribution system 1 may provide power to other devices such as the HVAC system 410, the water heater 420, or any other electric device that draws power. For example, each load center 200 may distribute power to a residence and all electric devices that use power in that residence. Various circuit breakers in addition to the EV charging circuit breakers 300 may be provided in the load centers 200 to provide power to electric devices other than the EVs 400.

In some embodiments, the load centers 10 may receive power from renewable power sources such as, without limitation, the photovoltaic system 20 in addition to power received from the transformer 100. The EV charging circuit breakers 300 may be configured to prioritize using power provided by the renewable power sources over the power provided from the utility 10 via the transformer 100. That is, if power is available from the renewable power source, the EV charging circuit breaker 300 will use that power to charge the EV 400.

Figure 2:
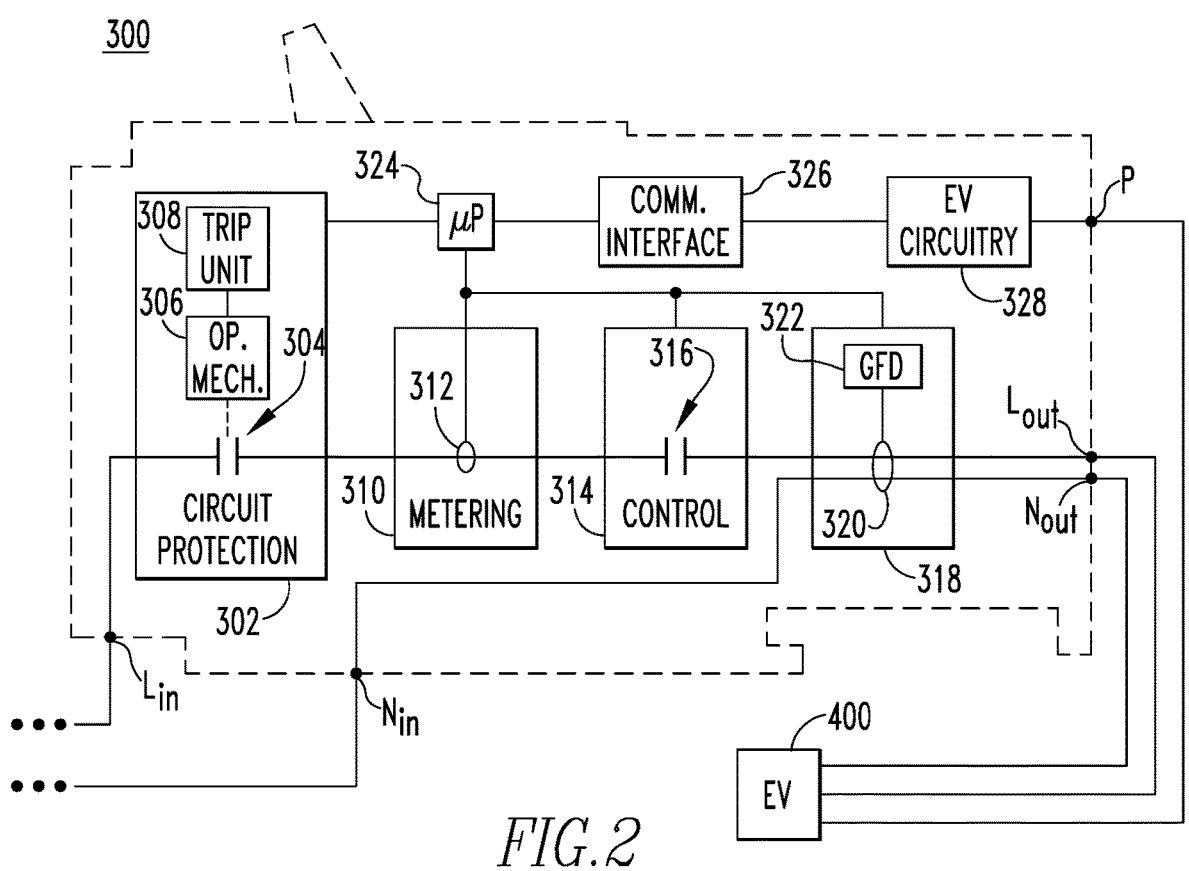
FIG. 2 is a schematic diagram of an electric vehicle charging circuit breaker in accordance with an example embodiment of the disclosed concept.

Referring to FIG. 2, a schematic diagram of an EV charging circuit breaker 300 according to an example embodiment of the disclosed concept is shown. The EV charging circuit breaker 300 includes several components, some of which will be described in more detail herein. The EV charging circuit breaker 300 is electrically connected between a power source (e.g., without limitation, the utility 10, the photovoltaic system 20, or another power source) and its corresponding EV 400. The EV charging circuit breaker 300 is configured to receive power from the power source via LINE (Lin) and NEUTRAL (Nout) input terminals and to provide power to the corresponding EV 400 via LINE (Lout) and NEUTRAL (Nout) output terminals. Signaling and communication may also be sent or received via a pilot (p) terminal.

The EV charging circuit breaker 300 includes circuit protection circuitry 302. The circuit protection circuitry 302 may include first separable contacts 304, an operating mechanism 306, and a trip unit 308. The circuit protection circuitry 302 is structured to detect a fault (e.g., without limitation, overcurrent, arc fault, etc.) by monitoring power flowing between the power source and the EV 400 and trip open the first separable contacts 304 in response to detecting the fault. For example, in some embodiments, the circuit protection circuitry 302 includes the trip unit 308 structured to receive information on the power flowing between the power source and the EV 400 via one or more sensors (not shown). Based on the received information, the trip unit 308 determines whether a fault is detected. In response to detecting a fault, the trip unit 308 outputs a trip signal to the operating mechanism 306. The operating mechanism 306 is structured to open and close the first separable contacts 304. In response to receiving the trip signal, the operating mechanism 306 is structured to trip open the first separable contacts 304. Although an example of circuit protection circuitry 302 has been described herein, it will be appreciated by those having ordinary skill in the art that other types of circuit protection circuitry may be employed without departing from the scope of the disclosed concept. For example and without limitation, in some embodiments the circuit protection circuitry 302 may include a thermal/ magnetic trip mechanism structured to trip open in response to predetermined fault conditions.

The EV charging circuit breaker 300 may also include metering circuitry 310 which is capable of metering power passing through the EV charging circuit breaker 300. The metering circuitry 310 may include one or more sensors such as a current sensor 312 used to sense the current of power flowing through the EV charging circuit breaker 300. The metering circuitry 310 may also include other type of sensors such as, without limitation, a voltage sensor (not shown).

The EV charging circuit breaker 300 may further include control circuitry 314. The control circuitry 314 may include second separable contacts 316. The second separable contacts 316 may be controlled to open or close regardless of whether a fault condition exists. For example and without limitation, the second separable contacts 316 may be opened to cause the EV charging circuit breaker 300 to stop charging the corresponding EV 400. The control circuitry may include a second operating mechanism (not shown) such as a solenoid to open and close the second separable contacts 316.

The EV charging circuit breaker 300 may additionally include ground fault detection circuitry 318. The ground fault detection circuitry 318 may include a ground fault coil 320 and a ground fault detector 322. The ground fault detection circuitry 318 is structured to sense current flowing through line and neutral conductors in the EV charging circuit breaker 300 and the ground fault detector 322 is structured to determine whether a ground fault is present based on the detected currents. In response to detecting a ground fault, the ground fault detector may output a ground fault signal. The EV charging circuit breaker 300 may cause the first or second separable contacts 304,316 is response to the ground fault being detected.

A communication interface 326 may also be provided in the EV charging circuit breaker 300. The communication interface 326 provides communication functionality which allows the EV charging circuit breaker 300 to communicate with other devices such as other EV charging circuit breakers 300, the transformer 100, or other devices. The communication interface 326 may provide functionality for wired or wireless communication using any suitable wired or wireless communication protocols.

A processing unit 324 is also provided in the EV charging circuit breaker 324. The processing unit 324 may include a processor and an associated memory. The processor may be, for example and without limitation, a microprocessor, a microcontroller, or some other suitable processing device or circuitry. The memory may be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. In some embodiments of the disclosed concept, one or more routines that may be executed by the processor may be stored in the memory of the processing unit 324.

The processing unit 324 may control the various components in the EV charging circuit breaker 300. Routines stored in the processing unit 324 which, when executed by the processing unit 324, cause the EV charging circuit breaker 300 to implement various functionality. In some embodiments, the processing unit 324 may store a routine which, when executed, causes the EV charging circuit breaker 300 to determine the random delay time and to stop charging its corresponding EV 400 until the random delay time after the end of the load peak period passes. Also, in some embodiments, the processing unit 324 may store a routine which, when executed, causes the EV charging circuit breaker 300 to implement the previously described load shedding algorithm.

The EV charging circuit breaker 300 further includes electric vehicle charging circuitry 328. The EV charging circuitry 328 allows the EV charging circuit breaker 300 to provide communication and/or control functionality associated with charging the corresponding EV 400. In some example embodiments of the disclosed concept, the EV charging circuitry 328 may generate a pilot signal that provides for signaling and communication for use by the corresponding EV 400. Some EV charging standards, such as the SAE J1772 and IEC 61851 standards, use a pilot signal to provide signaling and communication with an EV. For example, an SAE J1772 compliant pilot signal is a pulse width modulated signal whose voltage level indicates a charging status (e.g., standby, vehicle detected, ready, with ventilation, no power, error) and whose duty cycle indicates an ampere capacity of the charging equipment. In some embodiments, the EV charging circuitry 328 may generate a pilot signal in accordance with the SAE J1772 or the IEC 61851 standards.

Figure 3:
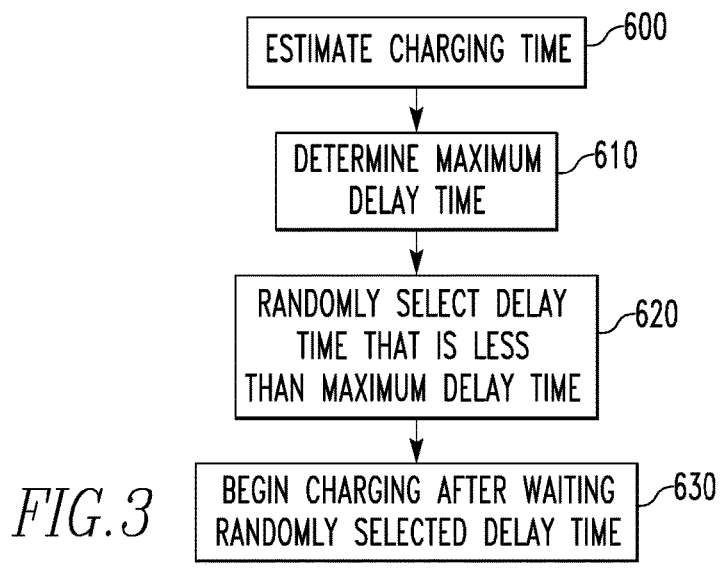
FIG. 3 is a flowchart of a constrained random delay method of charging an electric vehicle in accordance with an example embodiment of the disclosed concept.

FIG. 3 is a flowchart for a constrained randomized delay method for charging EVs. The method of FIG. 3 may be implemented in an EV charging circuit breaker 300. For example, the method may be implemented when a routine stored in the processing unit 324 is executed by the processing unit 324. At 600, the estimated charging time for the corresponding EV 400 to reach the fully charged state is estimated by the EV charging circuit breaker 300. For example, the EV charging circuit breaker 300 may use historical charge pattern data and the amount of time the EV 400 has currently been charging to estimate the charging time to reach the fully charged state.

At 610, the maximum delay time is determined. For example, the EV charging circuit breaker 300 may store start and end times associated with a predetermined charging window. The start and end times may be, for example, the end of a peak load period and a predetermined time in the morning. The EV charging circuit breaker 300 may determine the maximum delay time as the difference between the length of the predetermined charging window and the estimated amount of time required for the EV 400 to reach the fully charged state.

At 620, a random delay time is selected by the EV charging circuit breaker 300. The random delay time is an amount of time that is less than or equal to the maximum delay time. The random delay time is randomly selected with the constraint that it must be less than or equal to the maximum delay time. Any suitable method for selecting a random value may be employed to select the random delay time.

At 630, charging of the EV 400 is turned off until the random delay time passes from the start time of the predetermined charging window. Even if the EV 400 is plugged into the EV charging circuit breaker 300, the EV charging circuit breaker 300 will not start charging the EV 400 until the random delay time has passed after the start time of the predetermined charging window. For example, if the start time of the predetermined charging window is 8:00 PM and the random delay time is 1.5 hours, the EV charging circuit breaker 300 will begin charging the EV 400 at 9:30 PM. Since the random delay time is randomly selected, the random delay time may be a different amount of time the next day that the EV 400 is plugged into the EV charging circuit breaker 300 for charging.

In some example embodiments of the disclosed concept, the EV charging circuit breaker 300 may also be configured to turn off charging its corresponding EV 400 for a predetermined peak load period before the predetermined charging window. For example, the predetermined peak load period may be immediately before the predetermined charging period so the EV charging circuit breaker 300 will not be charging the EV 400 at the beginning of the predetermined charging window. However, it is contemplated that the EV charging circuit breaker 300 may charge the EV 400 in the period immediately preceding the predetermined charging window. In this case, the EV charging circuit breaker 300 may first stop charging the EV 400, and then wait the random delay time from the start of the predetermined charging window before starting to charge the EV 400 again.

It is contemplated that the method of FIG. 3 may be implemented in multiple EV charging circuit breakers 300 simultaneously. Since each EV charging circuit breaker 300 individually selects its own random delay time, it is unlikely that multiple EV charging circuit breakers 300 would begin charging their corresponding EVs 400 simultaneously. Moreover, the EV charging circuit breakers 300 do not need to communicate with each other to coordinate when to begin charging their corresponding EVs 400.

Figure 4:
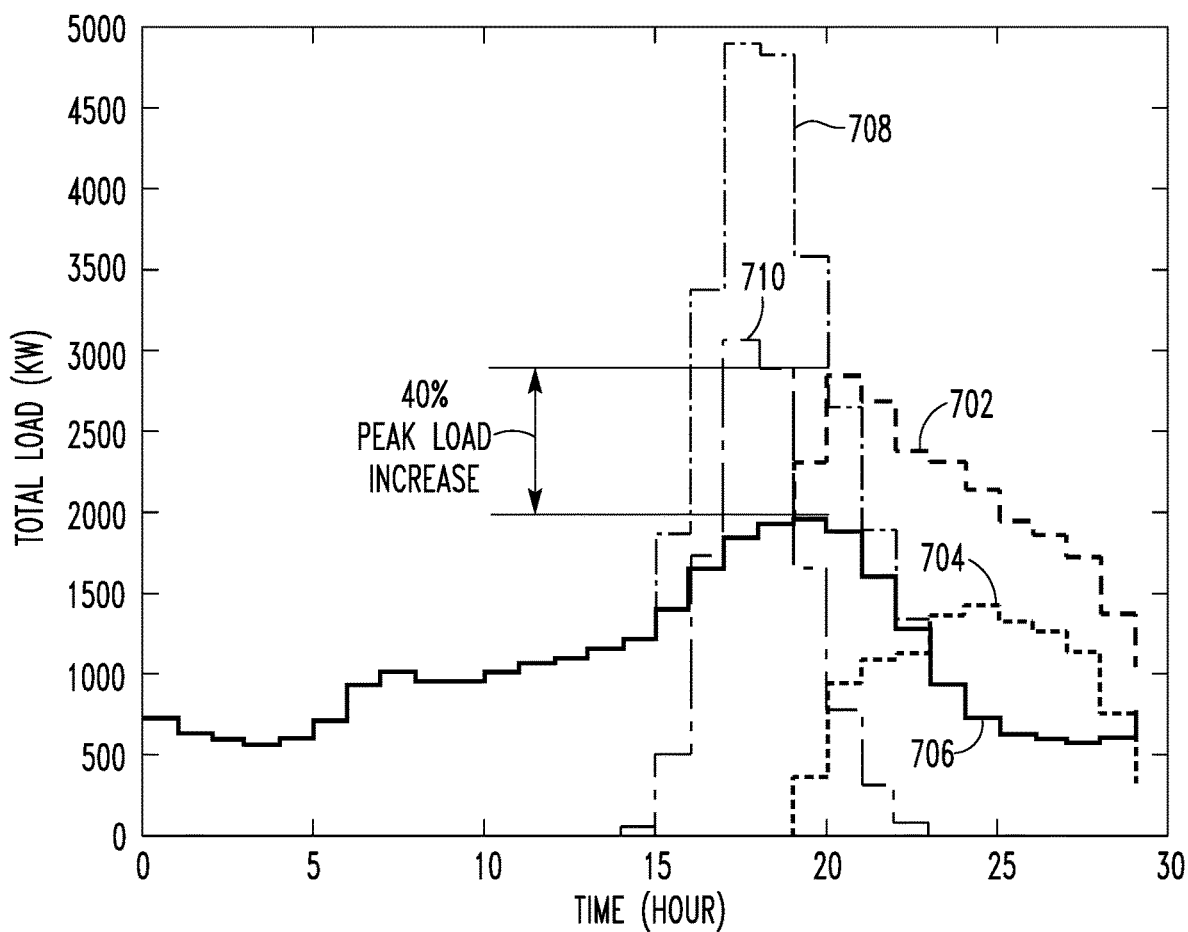
FIG. 4 is a chart illustrating a result of implementing the method of FIG. 3.

FIG. 4 is a chart of an example of the total load on the transformer 100 in the electrical distribution system 1 of FIG. 1 when the method of FIG. 3 is implemented in the EV charging circuit breakers 300. Additionally, in the example shown in FIG. 4, the EV charging circuit breakers 300 begin in a state where they are not charging their corresponding EVs 400 and only begin charging their corresponding EVs 400 after their respective random delay times from the start of the predetermined charging window. In this example, the predetermined charging window starts at 7:00 PM.

The example chart shows the total load 702 on the transformer 100. The base load 706 (i.e., the load due to non-EV devices) and the EV load 704 (i.e., the load due to charging EVs 400) are also shown. An alternate total load 708 and an alternate EV load 710 are also shown. The alternate total load 708 and the alternate EV load 710 are the loads that would be imposed on the transformer 100 if the EV charging circuit breakers 300 were permitted to immediately begin charging their corresponding EVs 400 when the EVs 400 were plugged in. The alternate total load 708 and alternate EV load 710 are based on random plug-in times having a mean of 5:30 PM and a standard deviation of 1.5 hours.

The chart of FIG. 4, shows a significant improvement in the peak load imposed on the transformer 100 when the method of FIG. 3 is implemented by the EV charging circuit breakers 300. For example, the peak of the total load 702 shows about a 40% increase over the peak of the base load 706 due to the EV load 704 when the method of FIG. 3 is implemented by the EV charging circuit breakers 300. The peak of the alternate total load 708, on the other hand, shows about a 145% increase over the peak of the base load 706.

Figure 5:
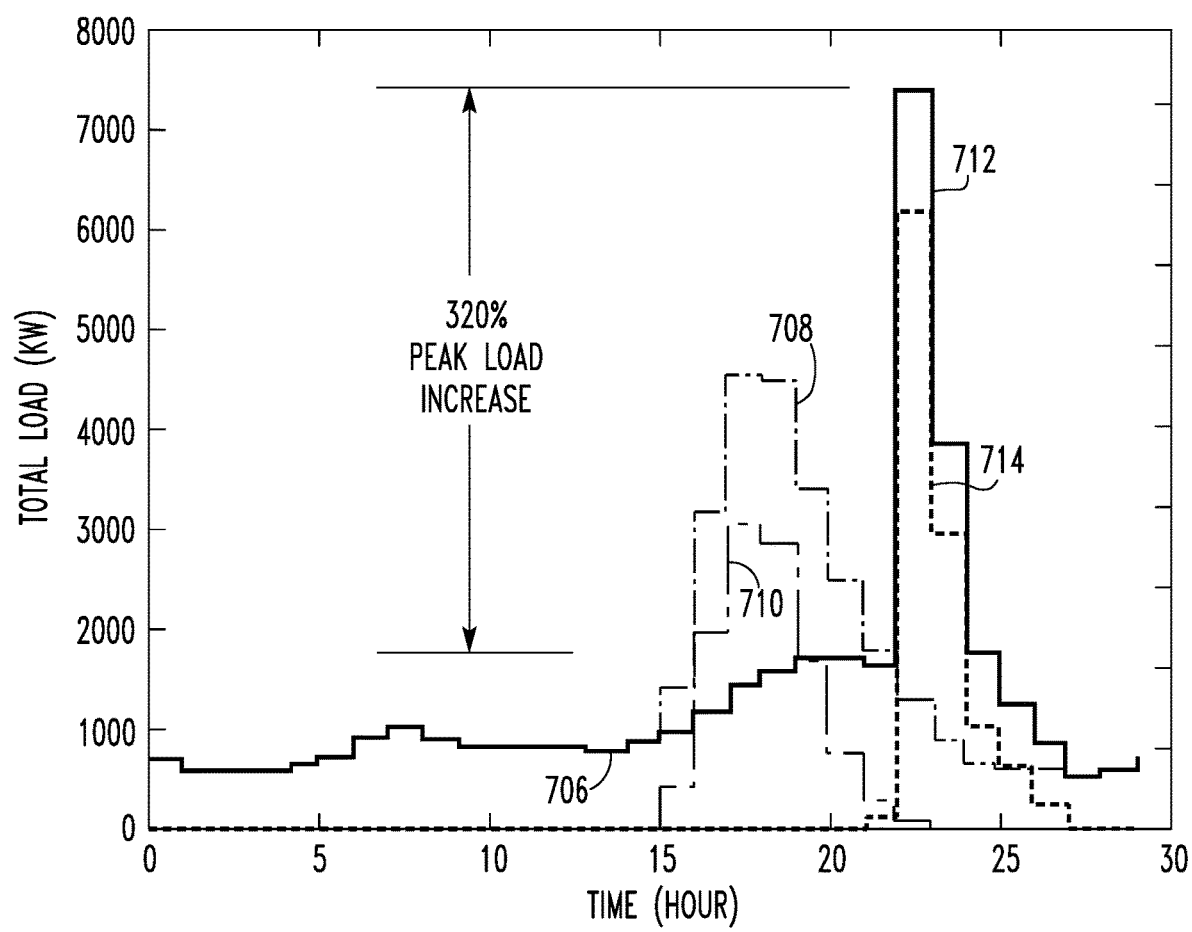
FIG. 5 is a chart illustrating the result of implementing a predetermined delay time method of charging an electric vehicle.

FIG. 5 is a chart of an example of the total load on the transformer 100 if the EV charging circuit breakers 300 delayed charging until a predetermined time after the start of the predetermined charging window rather than their respective random delay times. In other words, all EVs 400 plugged into their corresponding EV charging circuit breakers 300 will begin charging at the same time. In this example, the predetermined time is 10:00 PM. The total load 712 and the EV load 714, as well as the previously described base load 706, alternate total load 708, and alternate EV load 710, are shown in the chart of FIG. 5. As shown in FIG. 5, starting to charge the EVs 400 at the predetermined time causes the peak of the total load 712 to increase by about 320% over the peak of the base load 706. Also, as shown in FIG. 5, the EV load 714 is a significant cause of the higher peak. Thus, delaying charging the EVs 400 until a predetermined time, even if the predetermined time is after the peak load period, causes an increase in the peak of the total load 712 than if the method of constrained randomized delay of FIG. 3 is implemented in the EV charging circuit breakers 300.

Figure 6:
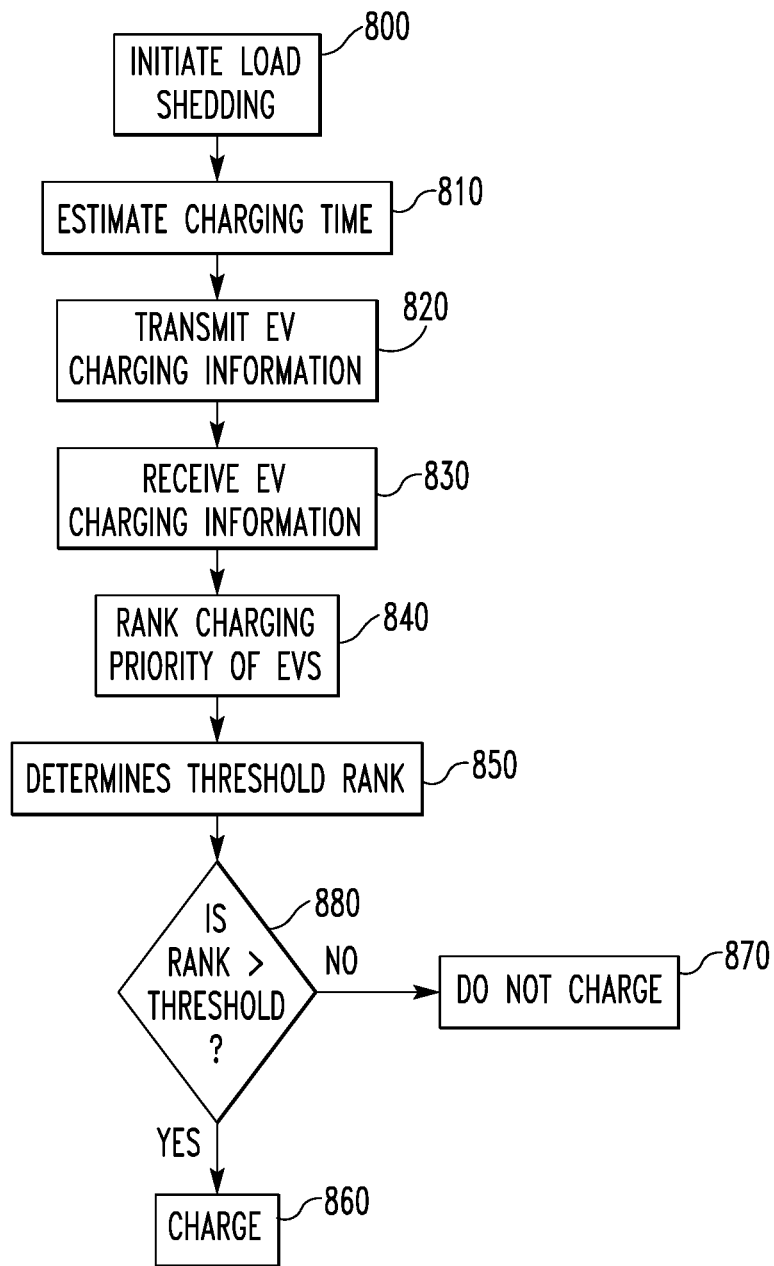
FIG. 6 is a flowchart of a load shedding algorithm in accordance with an example embodiment of the disclosed concept.

FIG. 6 is a flowchart of a method of load shedding in accordance with an example embodiment of the disclosed concept. The flowchart illustrates a load shedding algorithm that may be implemented, for example, in one or more of the EV charging circuit breakers 300 connected to the transformer 100 in the electrical distribution system 1 shown in FIG. 1. It is not necessary that all of the EV charging circuit breakers 300 connected to the transformer 100 implement the load shedding algorithm. Use of the load shedding algorithm may be incentivized, for example, by providing a customer who chooses to have the load shedding algorithm implemented in a EV charging circuit breaker 300 at their residence with a discount to their electric bill.

At 800, the load shedding process is initiated. The load shedding may be initiated at a predetermined time. Alternatively, the load shedding process may be initiated in response to an event. For example, the transformer 100 may issue a command to initiate the load shedding process when its load exceeds a threshold level. The load shedding process may have an associated load shedding level and a period of time. The load shedding level and period of time may be predetermined and stored in the EV charging circuit breaker 300. In some embodiments, the load shedding level and period of time may not be predetermined. For example, the load shedding level may be determined based on the total load imposed on the transformer 100 and the period of time may last until the total load imposed on the transformer 100 falls below a threshold level. However, it will be appreciated by those having ordinary skill in the art that the load shedding level and period of time may be based on other variables without departing from the scope of the disclosed concept.

At 810, the EV charging circuit breaker 300 estimates the charging time to reach a fully charged state for its associated EV 400. For example, the EV charging circuit breaker 300 may use historical charge pattern data and the amount of time the EV 400 has currently been charging to estimate the charging time to reach the fully charged state.

At 820, the EV charging circuit breaker 300 transmits the estimated charging time for its corresponding EV 400. For example, the EV charging circuit breaker 300 may transmit the estimated charging time to reach the fully charged state for its EV 400 to all of the other EV charging circuit breakers 300 that are connected to the transformer 100 and have implemented the load shedding algorithm. Any suitable method may be used to transmit the estimated charging times to all of the other EV charging circuit breakers 300. At 830, the EV charging circuit breaker 830 receives the estimated charging times from each of the other EV charging circuit breakers 300 that are implementing the load shedding algorithm.

At 840, the EV charging circuit breaker 300 ranks the charging priority of the EVs 400 corresponding to itself and the EV charging circuit breakers 300 that it received estimated charging times from. The ranks are based on the lengths of the estimated charging times. For example, an EV 400 having a longer estimated charging time will have a higher charging priority rank than an EV 400 with a shorter estimated charging time to reach the fully charged state.

At 850, the EV charging circuit breaker 300 determines the threshold rank. The threshold rank is the rank that divides which EVs 400 can continue charging and which EVs 400 should stop charging in order to stop charging the minimal number of EVs 400 while still lowering the total load on the transformer 100 by at least the amount of the load shedding level.

At 860, the EV charging circuit breaker 300 determines whether the charging priority rank of its corresponding EV 400 is greater than the threshold rank. If the charging priority rank of the corresponding EV 400 is less than or equal to the threshold rank, the EV charging circuit breaker 300 stops charging its corresponding EV 400 at 870. On the other hand, if the charging priority rank of the corresponding EV 400 is greater than the threshold rank, the EV charging circuit breaker 300 continues charging it corresponding EV 400 at 880.

It is contemplated that the load shedding algorithm may be implemented in multiple EV charging circuit breakers 300 simultaneously. The performance of the load shedding algorithm may be improved by increasing the number of EV charging circuit breakers 300 that implement it simultaneously as there will be more corresponding EVs 400 to rank and it may be easier to reduce the total load by the load shedding level.

Figure 7:
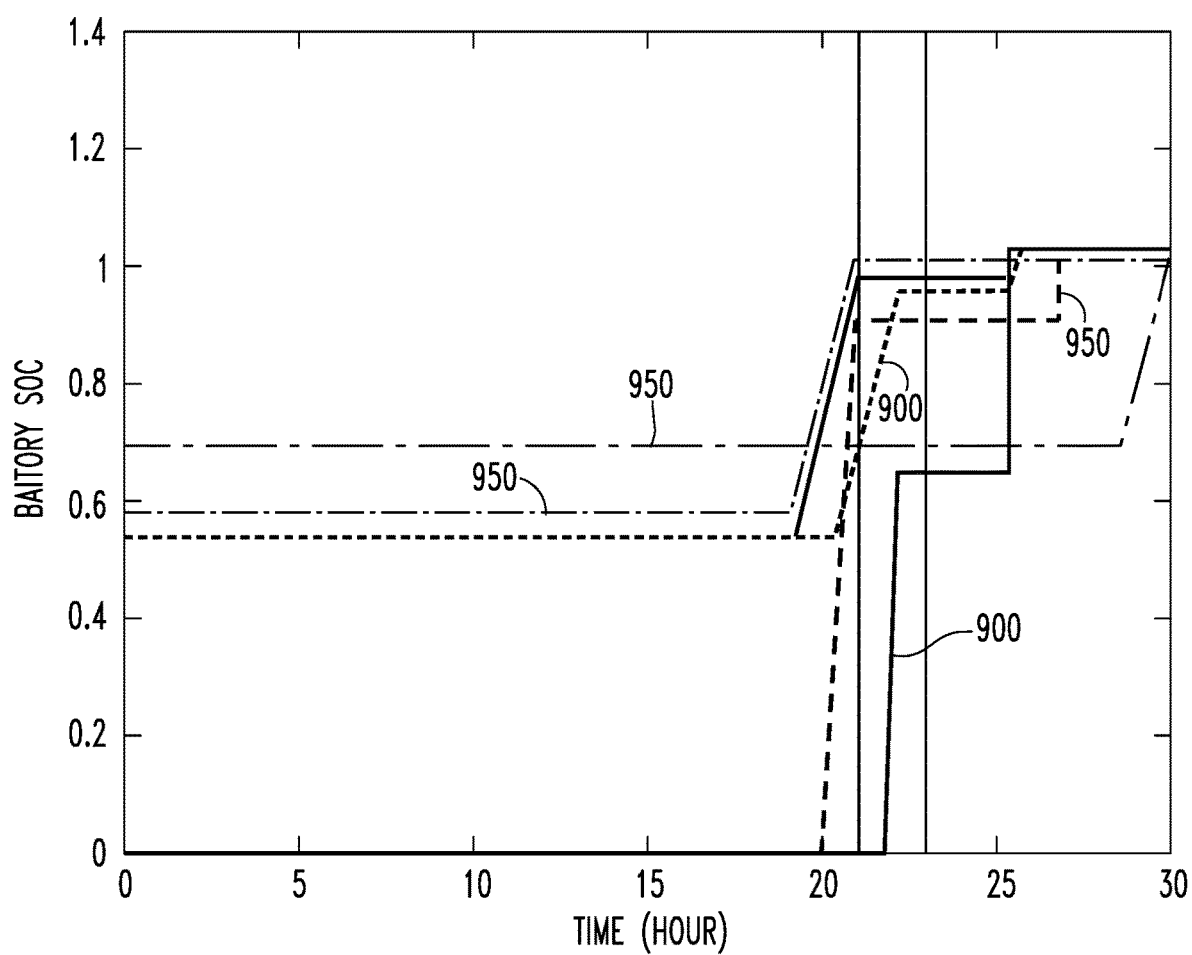
FIG. 7 is a chart illustrating a result of an implementation of the load shedding algorithm of FIG. 6.

FIG. 7 is a chart showing an example of an implementation of the load shedding algorithm in a number of EV charging circuit breakers 300 simultaneously. In the example shown in FIG. 7 the period of time associated with the load shedding algorithm is 9:00 PM-11:00 PM and the load shedding level is 100 kW. The chart in FIG. 7 illustrates the time versus the state of charge of a number of EVs 400. For simplicity of illustration, reference number 900 is used for plots corresponding to EVs 400 that are at or below the threshold rank at the beginning of the time period associated with load shedding and reference number 950 is used for plots corresponding to EVs 400 that are above the threshold rank at the beginning of the time period associated with load shedding. As shown in FIG. 7, charging for several EVs 400 (plots labeled with reference number 950) is stopped during the period of time associated with load shedding while charging for some EVs 400 (plots labeled with reference number 900) is allowed to continue during the period of time associated with load shedding. The result of stopping charging for some EVs 400 during the period of time associated with load shedding is that the total load on the transformer 100 is reduced by the load shedding level for that period. Additionally, stopping charging for EVs 400 having the lowest charging priority ranks increases the likelihood that EVs 400 that need more time to charge will not have their charging stopped during the period of time associated with load shedding.

It is contemplated that in some embodiments the load shedding algorithm may ensure that EVs 400 will be fully charged by a predetermined time in the morning. For example, if an EV 400 will not be fully charged by the predetermined time in the morning if its charging is stopped during the load shedding period of time, the load shedding algorithm may allow the EV 400 to continue charging even if its charging priority rank is at or below the threshold rank. However, this scenario is unlikely as an EV 400 needing a long time to become fully charged will have a higher charging priority rank and likely would not fall below the threshold rank.

Although EV charging circuit breakers 300 are disclosed in connection with the disclosed concept, it will be appreciated that embodiments of the disclosed concept may also be implemented in other types of EV charging devices without departing from the scope of the disclosed concept. For example, in some embodiments, the EV charging circuit breakers 300 may be replaced by EV charging devices that provide similar EV charging functionality as the EV charging circuit breakers 300, but do not provide circuit protection functionality.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof

What is claimed is:

1. An electric vehicle charging device for use in charging a corresponding electric vehicle electrically connected to the electric vehicle charging device, the electric vehicle charging device comprising:
   control circuitry structured to selectively allow the electric vehicle charging device to charge the electric vehicle;
   a communication interface structured to provide communication with other electric vehicle charging devices; and
   a processing unit having a memory with a routine stored therein which, when executed by the processing unit causes the processing unit to:
      initiate a load shedding process having an associated load shedding power level and a load shedding period of time;
      estimate a charging length of time needed for the electric vehicle to reach a fully charged state;
      control the communication interface to transmit the charging length of time to one or more other electric vehicle charging devices associated with other electric vehicles;
      receive charging length of times associated with other electric vehicles via the communication interface;
      determine charging priority ranks of the electric vehicle and the other electric vehicles based on the charging lengths of time associated with the electric vehicle and the other electric vehicles;
      determine a threshold rank based on the load shedding power level; and
      control the control circuitry to prevent the electric vehicle charging device from charging the electric vehicle for the load shedding period of time if the charging priority rank of the electric vehicle is equal to or less than the threshold rank and to allow the electric vehicle charging device to charge the electric vehicle for the load shedding period of time if the charging priority rank of the electric vehicle is greater than the threshold rank.

2. The electric vehicle charging device of claim 1, wherein the charging priority ranks of the electric vehicle and the other electric vehicles are sequentially assigned in order of the charging lengths of times of the electric vehicle and the other electric vehicles with the electric vehicle or other electric vehicle having the shortest charging length of time being given the lowest charging priority rank and the electric vehicle or other electric vehicle having the longest charging length of time being given the highest charging priority rank.

3. The electric vehicle charging device of claim 1, wherein stopping charging of the electric vehicle and/or other electric vehicles having charging priority ranks equal to or less than the threshold rank reduces a load caused by charging the electric vehicle and the other electric vehicles by at least the load shedding power level.

4. The electric vehicle charging device of claim 1, wherein the communication interface is structured to communicate wirelessly with the other electric vehicle charging devices.

5. The electric vehicle charging device of claim 1, wherein the routine stored in the memory, when executed by the processing unit, further causes the processing unit to:
   begin load shedding based on a communication received from a transformer that provides power to the electric vehicle charging device and other electric vehicle charging devices,
   wherein the transformer is structured to send the communication in response to a load drawn from the transformer by the electric vehicle charging device and the other electric vehicle charging devices exceeding a predetermined level.

6. The electric vehicle charging device of claim 1, further comprising:
   a circuit protection unit structured to provide circuit protection between the electric vehicle and a power source, the circuit protection unit including:
      separable contacts electrically connected between the electric vehicle and the power source; and
      an operating mechanism structured to trip open the separable contacts in response to a fault being detected.

7. The electric vehicle charging device of claim 1, wherein executing the routine further causes the processor to:
   estimate a full charge length of time based on historical charge pattern data, wherein the full charge length of time is the length of time for the electric vehicle to reach the fully charged state from the time it is electrically connected to the electric vehicle charging device if the electric vehicle is continuously charged;
   determine a current charge length of time as an amount of time the electric vehicle has been charging since it has been electrically connected to the electric vehicle charging device; and
   determine the charging length of time needed for the electric vehicle to reach a fully charged state as the full charge length of time minus the current charge length of time.

8. The electric vehicle charging device of claim 6, wherein the circuit protection unit further comprises:
   a trip unit structured to receive information on power between a power source and the electric vehicle and to determine whether the fault is detected based on the information.

9. The electric vehicle charging device of claim 8, wherein the trip unit is structured to output a trip signal to the operating mechanism in response to the fault being detected, and wherein the operating mechanism is structured to trip open the first separable contacts in response to receiving the trip signal from the trip unit.

10. The electric vehicle charging device of claim 6, wherein the circuit protection unit includes a thermal/magnetic trip mechanism.

11. The electric vehicle charging device of claim 6, wherein the control circuitry includes second separable contacts, and wherein the control circuitry is structured to open the second separable contacts to prevent the electric vehicle charging device from charging the electric vehicle.

12. The electric vehicle charging device of claim 1, further comprising:
   electric vehicle charging circuitry structured to generate a pilot signal that provides signaling or communication for use by the electric vehicle.

13. The electric vehicle charging device of claim 6, further comprising:
   a housing structured to house the control circuitry, the circuit protection unit, and the processing unit.

14. A method of charging an electric vehicle with an electric vehicle charging device, the method comprising:
   initiate a load shedding process having an associated load shedding power level and a load shedding period of time;
   estimating a charging length of time associated needed for the electric vehicle to reach a fully charged state;
   transmitting the charging length of time to one or more other electric vehicle charging devices associated with other electric vehicles;
   receiving charging length of times associated with other electric vehicles;
   determining charging priority ranks of the electric vehicle and the other electric vehicles based on the charging lengths of time associated with the electric vehicle and the other electric vehicles;
   determining a threshold rank based on the load shedding power level; and
   preventing the electric vehicle charging device from charging the electric vehicle for the load shedding period of time if the charging priority rank of the electric vehicle is equal to or less than the threshold rank and allowing the electric vehicle charging device to charge the electric vehicle for the load shedding period of time if the charging priority rank of the electric vehicle is greater than the threshold rank.

15. The method of claim 14, wherein the charging priority ranks of the electric vehicle and the other electric vehicles are sequentially assigned in order of the charging lengths of times of the electric vehicle and the other electric vehicles with the electric vehicle or other electric vehicle having the shortest charging length of time being given the lowest charging priority rank and the electric vehicle or other electric vehicle having the longest charging length of time being given the highest charging priority rank.

16. The method of claim 14, wherein stopping charging of the electric vehicle and/or other electric vehicles having charging priority ranks equal to or less than the threshold rank reduces a load caused by charging the electric vehicle and the other electric vehicles by at least the load shedding power level.

17. The method of claim 14, wherein transmitting the charging length of time to one or more other electric vehicle charging devices associated with other electric vehicles includes wirelessly transmitting the charging length of time to one or more other electric vehicle charging devices associated with other electric vehicles.

18. The method of claim 14, further comprising:
receiving a communication from a transformer that provides power to the electric vehicle charging device and other electric vehicle charging devices; and
beginning load shedding based on the communication, wherein the transformer is structured to send the communication in response to a load drawn from the transformer by the electric vehicle charging device and other electric vehicle charging devices connected to the transformer exceeding a predetermined level.

19. The method of claim 14, wherein estimating a charging length of time needed for the electric vehicle to reach a fully charged state further comprises:
estimating a full charge length of time based on historical charge pattern data, wherein the full charge length of time is the length of time for the electric vehicle to reach the fully charged state from the time it is electrically connected to the electric vehicle charging device if the electric vehicle is continuously charged;
determining a current charge length of time as an amount of time the electric vehicle has been charging since it has been electrically connected to the electric vehicle charging device; and
determining the charging length of time as the full charge length of time minus the current charge length of time.

20. A method of charging an electric vehicle with an electric vehicle charging device, the method comprising:
estimating a charging length of time needed for the electric vehicle to reach a fully charged state;
determining a maximum delay length of time as a difference between a predetermined length of time and the charging length of time, wherein the predetermined length of time is defined by a predetermined start time and a predetermined end time;
randomly selecting a random delay length of time that is less than or equal to the maximum delay length of time; and
preventing the electric vehicle charging device from charging the electric vehicle for a random delay period and allowing the electric vehicle charging device to charge the electric vehicle starting when the random delay period ends, wherein the random delay period starts at the predetermined start time and lasts the random delay length of time.

* * * * *